(12) United States Patent
Rhoden (10) Patent No.: US 11,774,008 B2
(45) Date of Patent: Oct. 3, 2023

(54) RISER RING SYSTEM AND METHOD OF USE

(71) Applicant: Roger Brent Rhoden, Evans, GA (US)

(72) Inventor: Roger Brent Rhoden, Evans, GA (US)

( * ) Notice: Subject to any disclaimer, the term of this patent is extended or adjusted under 35 U.S.C. 154(b) by 156 days.

(21) Appl. No.: 16/833,660

(22) Filed: Mar. 29, 2020

(65) Prior Publication Data

US 2021/0301950 A1 Sep. 30, 2021

(51) Int. Cl.
| | |
|---|---|
| *F16L 5/00* | (2006.01) |
| *F16L 5/10* | (2006.01) |
| *F16L 3/12* | (2006.01) |
| *F16L 3/18* | (2006.01) |

(52) U.S. Cl.
CPC .............. *F16L 5/10* (2013.01); *F16L 3/1218* (2013.01); *F16L 3/18* (2013.01); *F16L 5/00* (2013.01)

(58) Field of Classification Search
CPC ... F16L 3/1218; F16L 3/18; F16L 5/00; F16L 5/10
USPC ...................................................... 52/220.8
See application file for complete search history.

(56) References Cited

U.S. PATENT DOCUMENTS

| | | | | | |
|---|---|---|---|---|---|
| 1,080,520 | A | * | 12/1913 | Schuermann | F16L 5/00 285/193 |
| 3,684,220 | A | * | 8/1972 | Logsdon | F16L 5/00 248/56 |
| 7,010,889 | B1 | * | 3/2006 | Renfro | F16L 3/1091 52/220.8 |
| 7,784,234 | B2 | * | 8/2010 | Warmolts | F16L 5/025 52/220.8 |
| 8,276,854 | B2 | * | 10/2012 | Mominee | F16L 3/1016 248/62 |
| 9,982,803 | B2 | * | 5/2018 | Kipp | E03C 1/021 |
| 10,119,632 | B2 | * | 11/2018 | Lin | F16L 5/04 |
| 10,914,407 | B2 | * | 2/2021 | Ohnemus | F16L 21/065 |
| 2019/0346069 | A1 | * | 11/2019 | Harris | F16L 3/222 |

* cited by examiner

*Primary Examiner* — Kevin F Murphy
(74) *Attorney, Agent, or Firm* — Carlo Julio Salas; Maynard Nexsen PC (57) ABSTRACT

A system for and a method of preventing a conduit, pipe, or other similar traversing piece of equipment, from falling through an opening, and for facilitating ready adjustment of the traversing piece of equipment during installation, maintenance, and/or repair services. A first embodiment may involve a single-component system or a multi-component system. A second embodiment may involve a multi-component system for and method of effectively increasing the diameter of a conduit or pipe to an amount greater than that of an opening, but in a way such that the conduit or pipe can be adjustably extended without need for disengaging the system or back-tracking/reversing the method. A third embodiment may involve an annular riser ring and method of use thereof, wherein the riser ring is configured to slide over a conduit or pipe and is held in place along the pipe or conduit by a tight but slidable friction fit.

5 Claims, 8 Drawing Sheets

RISER RING SYSTEM AND METHOD OF USE

BACKGROUND OF THE INVENTION

Technical Field

The present invention generally relates to the field of riser clamps and other similar devices for securely situating a conduit in place for installation, maintenance, and/or repair services. The present solution facilitates efficient and effective installation, maintenance, and/or repair services for a conduit or other similar traversing pieces of equipment, and lessens the operating-costs, capital expenditures, and/or labor needed to complete a full servicing of the equipment.

Prior Art

Somewhere in a new-build construction setting, or a demolition-renovation setting, for example, where there is a sub-surface slab below (the floor below) and a sub-surface slab above (the floor above) a construction site, a conduit or riser pipe likely must traverse and extend through the floor below and the floor above, across the construction site, and extend from the bottom of the building through all of the floors, to the top of the building. The floors of the building each respectively define a hole(s) to allow the riser pipe to extend through the lower floor(s) up through the upper floor(s). The conduit has a slightly smaller diameter than the hole(s) in the floor(s), which allows the conduit to readily traverse and extend through the floor(s) and slide through the floor(s) during any relevant installation, maintenance, and/or repair services.

Currently in the field, when a conduit is to be situated and placed through the hole(s) in the floor(s), the conduit is extended through the hole and then a clamp is engaged to the conduit and bolted in place to prevent the conduit from falling through the hole(s). An embodiment of this type of arrangement is illustrated in FIG. 1.

Figure 1:
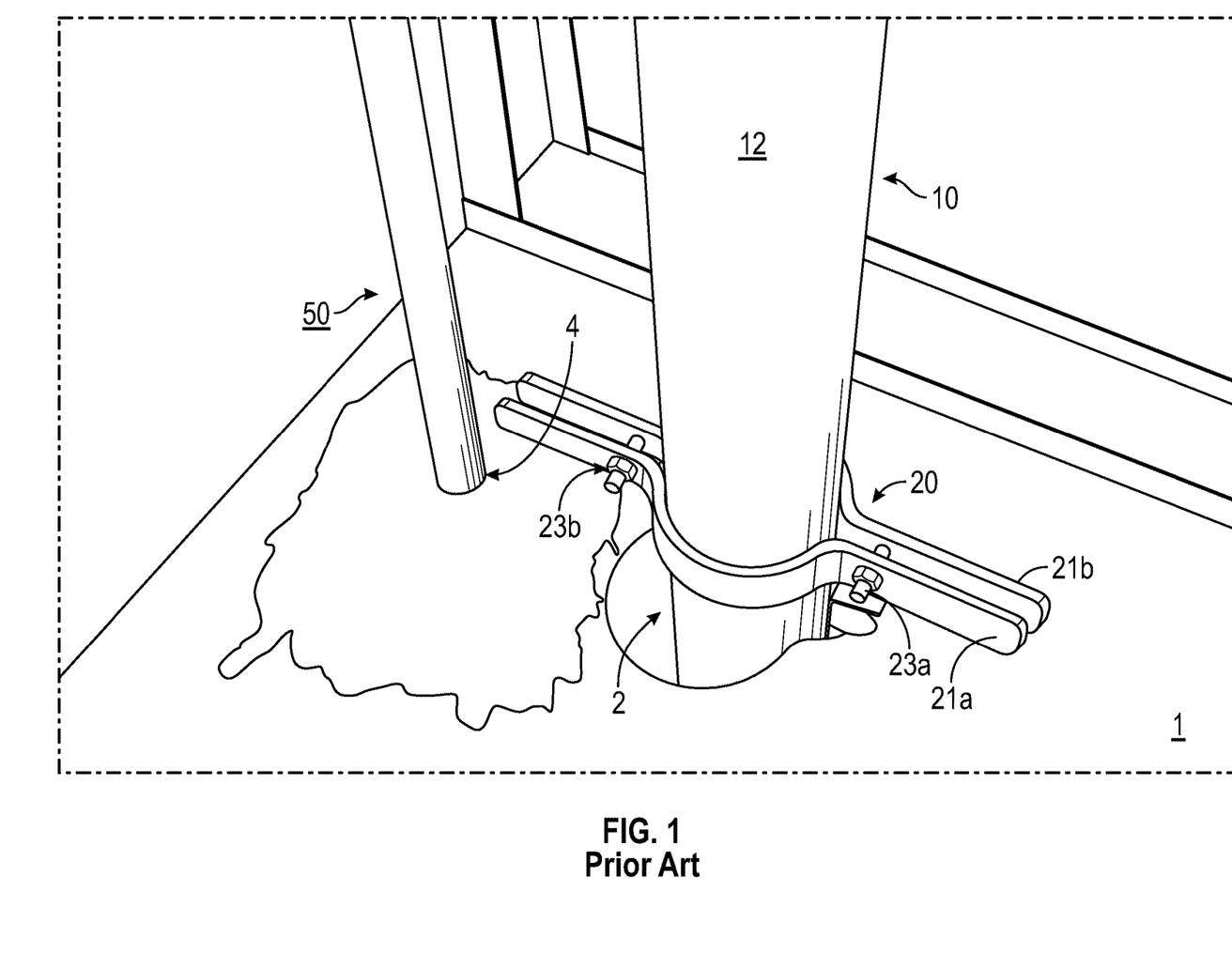

FIG. 1, in particular, illustrates a non-limiting example of a riser clamp. A riser clamp generally is a bulky and heavy piece of equipment, usually made of heavy duty metal alloys, typically intended to be removed when any relevant services for a conduit are completed. An installed riser clamp commonly is left in place for simplicity and cost-savings in labor (despite the cost of the lost equipment), unless the floor(s) needs to be finished around the conduit. If this is the case, then the clamps must to be removed and the hole(s) must be at least partially filled to allow the floor(s) to be finished and tiled around the conduit. This adds extra labor time, planning-and-effort, and associated costs.

It is, therefore, desirable to overcome the deficiencies of and provide for improvements in the state of the prior art. There is a need in the art to provide a riser ring system that solves all the problems in the art, and that provides a more efficient and effective tool or piece of equipment for solving these problems.

Accordingly, there is now provided with this disclosure a riser ring system, and a method of use thereof, for overcoming the aforementioned difficulties and longstanding problems inherent in the art. As used herein, any reference to an object of the present invention should be understood to refer to solutions and advantages of the present invention, which flow from its conception and reduction to practice, and not to any a priori or prior art conception. A better understanding of the principles and details of the present invention will be evident from the following detailed description.

SUMMARY OF THE INVENTION

An exemplary embodiments of the invention is directed to a method of servicing a riser stack that extends through an opening in a floor. The method comprises providing a riser pipe segment defining a length and having an external surface and providing a riser ring. The method also comprises extending the riser pipe segment through an opening in a floor and sliding the riser ring over the external surface of the riser pipe segment to a first position along the length of the riser pipe segment, such that the riser ring and the riser pipe segment are engaged via a friction fit. The method also comprises placing the riser ring with the engaged riser pipe segment onto the floor such that the riser pipe segment is prevented from falling through the opening by the riser ring.

In certain instances, the exemplary method may comprise adjusting, from below the floor or from above the floor, the extent the riser pipe segment extends through the opening while the riser ring remains in contact with the floor, using the floor as leverage.

In certain instances, the exemplary method may comprise finishing the floor around the opening such that the riser ring is embedded in the finished floor.

Another exemplary embodiments of the invention is directed to a method of servicing a riser stack that extends through an opening in a floor. The method comprises the same acts as the exemplary embodiment presented above but additionally comprises adjusting, while the riser ring remains in contact with the floor, the extent the riser pipe segment extends through the opening in the floor, by pulling or pushing the riser pipe segment, such that the riser ring slides over the external surface of the riser pipe segment to a second position along the length of the riser pipe segment.

In certain instances, the exemplary method may comprise performing the pulling or pushing act from below the floor or from above the floor using at least the floor as leverage while the riser ring remains in contact with the floor.

In certain instances, the exemplary method may comprise finishing the floor around the opening such that the riser ring is embedded in the finished floor.

Another exemplary embodiments of the invention is directed to a riser ring device for servicing a riser stack segment. The riser stack segment that would relate to the riser ring defines a length and has an external surface. The riser ring comprises a ring body having an inside surface and outside surface. The ring body is configured to slide over an external surface of a riser pipe segment, to a position along a length of a riser pipe segment, via a slidable friction fit between the inside surface of the ring body and an external surface of the riser pipe segment, and hold the weight of the riser pipe segment and prevent the riser pipe segment from sliding out of the ring body.

In certain instances, the exemplary device is configured for a 2-6 inch riser pipe segment.

In certain instances, the exemplary device is between about ½ inches to about ⅝ inches thick. In other instances, the exemplary device is between about ¼ inches to about ⅝ inches wide. In other instances, the riser ring is between about ½ inches to about ⅝ inches thick and between about ¼ inches to about ⅝ inches wide.

In certain instances, the inside surface of the ring body is in a circle configuration, a square configuration, or in a circle configuration with the outside surface in a square configuration, or vice versa.

In certain instances, the exemplary device has an annular ring body.

BRIEF DESCRIPTION OF THE DRAWINGS

FIG. 1 is a perspective view of a non-limiting example of a prior art floor within a new-build construction setting or a demolition-renovation setting; in particular, FIG. 1 is a magnified perspective view of a non-limiting example of a first plumbing system riser stack, with a non-limiting example of a riser clamp still engaged to a riser pipe segment of a riser stack, and a non-limiting example of a second riser stack, both extending through a floor 1.

FIG. 3 is a perspective view of a non-limiting example of an upper floor and a lower floor within a new-build construction setting or a demolition-renovation setting; in particular, FIG. 3 is perspective view of a non-limiting example of a first riser pipe segment for a plumbing system riser stack, with a riser ring of FIG. 2 engaged thereto, extending through the upper floor and being prevented from falling through the opening in the upper floor.

DETAILED DESCRIPTION

For a further understanding of the nature, function, and objects of the present invention, reference should now be made to the following detailed description. While detailed descriptions of the preferred embodiments are provided herein, as well as the best mode of carrying out and employing the present invention, it is to be understood that the present invention may be embodied in various forms. Specific details disclosed herein are not to be interpreted as limiting but rather as a basis for the claims and as a representative basis for teaching one skilled in the art to employ the present invention in virtually any appropriately detailed system, structure, or manner.

The word "exemplary" is used herein to mean serving as an example, instance, or illustration. Any aspect described herein as "exemplary" is not necessarily to be construed as exclusive, preferred, or advantageous over other aspects.

Embodiments and aspects of the present invention provide an efficient, effective, and cost-effective riser ring system and method of use for (1) preventing a conduit, or other similar traversing piece of equipment, from falling through a riser hole(s) or other similar void, and (2) for adjustably situating and securely holding the traversing piece of equipment for installation, maintenance, and/or repair services. The inventive concepts described herein provide a solution that is not susceptible to the limitations and deficiencies of the prior art. Further, the inventive concepts described herein lessen the operating-costs, capital expenditures, and/or labor associated with any necessary servicing of a piece of equipment and/or infrastructure that must traverse through a building or other structure.

As further background and context, and with reference to Prior Art FIG. 1, it is common for a new-build construction setting or a demolition-renovation setting to require complete installation or substantial maintenance services of the entire plumbing system. The plumbing system may comprise 3 to 4 inch pipe for drainage and 2 to 3 inch pipe for fluid intake, but numerous variations of pipe/conduit and different sizes/dimensions are understood in the art.

In certain instances, a series of pipe segments, united by a friction fit or bonding-agent coupling between adjacent segments (e.g., 2 to 4 inch couplings, respectively, where appropriate), may vertically traverse via an opening(s) or a void(s) in the structure, through at least a portion of a building or structure, across a construction site or demolition-renovation site. This configuration is known as a riser pipe stack.

When a riser pipe stack is to be installed, a single pipe segment usually is placed and extended through an opening in the structure, through a floor or other major structural component, and securely held in place until further installation of the adjacent pipe segment in the riser pipe stack is completed. After a pipe segment is extended through the opening (and the pipe segment is sufficiently and, sometimes, only approximately extended far-enough through the opening to allow for further servicing of the adjacent pipe segment), the pipe segment is clamped in place via a riser clamp to prevent the pipe segment from falling through the opening.

The riser clamp rigidly holds the pipe segment in place as further servicing is performed on the adjacent pipe. Typically, one to two coupled pipe segments are needed to extend across a construction or demolition-renovation site, as between floors or on a ground-floor, for example. A riser opening typically also has a slightly larger diameter than a pipe segment which, therefore, allows the pipe segment to readily traverse through the floor without too much space between the pipe segment and the floor. Further, a riser clamp generally comprises two bulky metal halves that bolt together, such that the space defined between the halves substantially complements the cross-sectional shape of the pipe segment.

A riser clamp, therefore, is configured to receive and sandwich around the outside periphery of the pipe segment when bolted to effectively increase the diameter of the pipe beyond that of the riser opening, and to effectively prevent the pipe segment from falling through the opening. A riser clamp may come in various sizes and configurations and on average they may cost from about $3.50 per riser clamp for a 3 to 4 inch compatible clamp to about $5.00 per riser clamp for a 4 to 6 inch compatible clamp. Due to this relatively high cost compared to other construction equipment, a riser clamp is intended to be removed when servicing of the pipe segment is completed; however, an installed riser clamp commonly is left in place for simplicity and cost-savings in labor, unless the floor needs to be finished around the pipe segment.

When one or more riser pipe stacks are to be installed or serviced in a new-build construction setting or a demolition-renovation setting (e.g., a hotel or motel new-build or demolition-renovation), it is common for there to be numerous riser openings grouped together, in the floor above and the floor below. Some of the riser openings are redundant in size and some are different in size for each group of riser pipes. Further, each group may be consistently spaced along the construction or demolition-renovation setting. The often times closely spaced groups of riser openings correspond to riser stacks that are intended to traverse through the openings.

When the pipes segments have not yet been situated through the riser openings, it is difficult to remember and visualize which openings line-up for each specific riser stack. This is especially true if the closely spaced openings are of similar diameter but intended for different riser pipe types and not properly aligned despite the appearance to the naked eye.

Under these circumstances, it is common to place, approximate, and extend through the proper openings, one pipe segment through each of the openings, across an entire floor, such that the work being performed on the floor below can be done with the corresponding pipe segment already in place and hanging down from the floor above. Next, the riser clamps are engaged onto the pipe segments to prevent the pipe segments from falling through the openings.

Unfortunately, the riser clamps also prevent the pipe segments from being readily adjusted, should an adjustment be needed. An adjustment to a hanging pipe segments usually is needed to facilitate the work performed from the floor below. The work being performed from the floor below ultimately ends up depending on the original approximation of the pipe segment.

If adjustment of the pipe segment is necessary, then the pipe segment must be adjusted by unbolting the two halves of the riser clamp, from the floor above, and adjusting the length of the traversing pipe segment to the desired length, and then re-bolting the riser clamp from the floor above. A person having ordinary skill in the art understands that this takes time and labor.

Sometimes, even if adjustment to the pipe segment is not necessary, and when the riser pipe stack is completed for at least one floor (between an upper sub-surface slab and a lower sub-surface slab, for example), removal of the riser clamp may be skipped. This leaves behind the engaged riser clamps even when they are no longer needed; primarily due to cost-saving reasons. Most times, removal of the riser clamp may not be skipped.

For example, when the floor surrounding the traversing pipe segment necessitates further finishing, removal of the riser clamp may not be skipped. If this is the case, then the riser clamps must be removed and the openings must be at least partially filled to allow the sub-surface slab/floor to be finished and tiled around the traversing conduit. Again, a person having ordinary skill in the art understands that this adds extra labor-time, planning and effort, and associated costs.

FIG. 1 is a perspective view of a non-limiting example of a prior art floor 1 within a new-build construction setting or a demolition-renovation setting. In particular, FIG. 1 is a magnified perspective view of a non-limiting example of a first plumbing system riser stack 10, with a non-limiting example of a riser clamp 20 still engaged to a riser pipe segment 12 of the riser stack 10, and a non-limiting example of a second riser stack 50, both extending through the floor 1.

The riser pipe segment 12 of the first riser stack 10 generally defines the riser stack and is 6 inches in diameter. The first riser stack 10 vertically traverses the new-build or demolition-renovation setting via riser opening 2 in the floor 1. The second riser stack 50 is 2 inches in diameter. The second riser stack 50 vertically traverses the new-build or demolition-renovation setting via riser opening 4 in the floor 1.

The riser openings 2 and 4 have a slightly larger diameter than their respective riser stack 10 and 50 which, therefore, allows the risker stacks 10 and 50 to readily traverse through the floor 1 without too much space between the pipe segment 12 and the floor 1, for example. The riser opening 4 for riser stack 50 is not readily visible as it has been partially finished for fire-proofing purposes as is understood in the art.

Further, the riser clamp 20 is engaged to the riser pipe segment 12 of the riser stack 10 via the two metal halves 21a,b being clamped together via bolts 23a,b. The space defined between the halves 21a,b substantially complements the cylindrical shape of the pipe segment 12 and, therefore, the riser clamp 20 sandwiches the pipe segment 12. This effectively increases the diameter of the pipe segment 12 beyond the diameter of the riser opening 2 in the floor 1 and, therefore, the riser clamp 20 prevented the pipe segment 12 from falling through the opening during any prior servicing of the riser stack 10.

With the above context in mind, a first exemplary embodiment of the inventive concepts provides a system for and a method of preventing a conduit, pipe, or other similar traversing piece of equipment, from falling through an opening, and for facilitating ready adjustment of the traversing piece of equipment during installation, maintenance, and/or repair services even when the system is already engaged, or the method is underway. There is no need to disengage the system or back-track/reverse the method in order to make adjustments.

A conduit or pipe segment, for example, may be approximately placed and extended through the proper openings in a floor above. From the floor below, the conduit or pipe segment may be readily adjusted without need for any structural change to the system, and without any added steps. The first embodiment may involve a single-component system or a multi-component system. In this way, the inventive concepts described herein, through various structural configurations, achieve the same technical effect and lessen the operating-costs, capital expenditures, and/or labor associated with any necessary servicing of a traversing piece of equipment.

A second exemplary embodiment of the inventive concepts provides a multi-component system for and method of effectively increasing the diameter of a conduit, pipe, or other similar traversing piece of equipment, to an amount greater than that of the opening, but in a way such that the conduit or pipe can still be adjustably extended without need for disengaging the system or back-tracking/reversing the method. The second embodiment leverages a tight but adjustable friction-fit as between the system components and the conduit or pipe, such that the system fits snuggly but slidably to prevent the conduit or pipe from falling through the opening. In certain instances, the second embodiment may incorporate a mechanism, other functional device, or means for establishing the tight but adjustable friction-fit as between the system components and the conduit or pipe.

A third exemplary embodiment of the inventive concepts provides an annular riser ring and method of use thereof, wherein the riser ring is configured to slide over a conduit, pipe, or other similar traversing piece of equipment and is held in place along the pipe or conduit by a friction fit. The third embodiment is a single-component loop configured such that, when a conduit or pipe segment, for example, is approximately extended through an opening in a floor, and the loop is slide over the conduit or pipe and into place, the annular riser ring effectively increases the diameter of the conduit or pipe such that the conduit or pipe cannot fall through the opening. In this way, the annular riser ring establishes a tight but slidable friction-fit with the conduit or pipe, such that the conduit or pipe can be adjustably extended from the floor below without need for disengaging the system or back-tracking/reversing the method, and such that the annular riser ring fits snuggly to prevent the conduit or pipe from falling through the opening in the floor above.

The annular riser ring of the third exemplary embodiment does not need to be clamped or bolted. The annular riser ring also is made out of the same material as the conduit or pipe, or any other material known to one having ordinary skill the art, and may come in various sizes and configurations to accommodate various different types of conduits, pipes, or other similar traversing piece of equipment. The annular riser ring, therefore, is light and cheap, with a thin and small profile, and manufactured in bulk, for mere cents, and the ring does not need to be removed, even if the floor(s) needs to be finished around the pipe or conduit. Instead, even if the floor needs to be finished around the conduit or pipe, the engaged annular riser ring can remain and become embedded into the finished floor, grout, mud base, gyperete, concrete, or tile.

Embodiments and aspects of the present solution become apparent from the drawings and the following detailed description.

Figure 2:
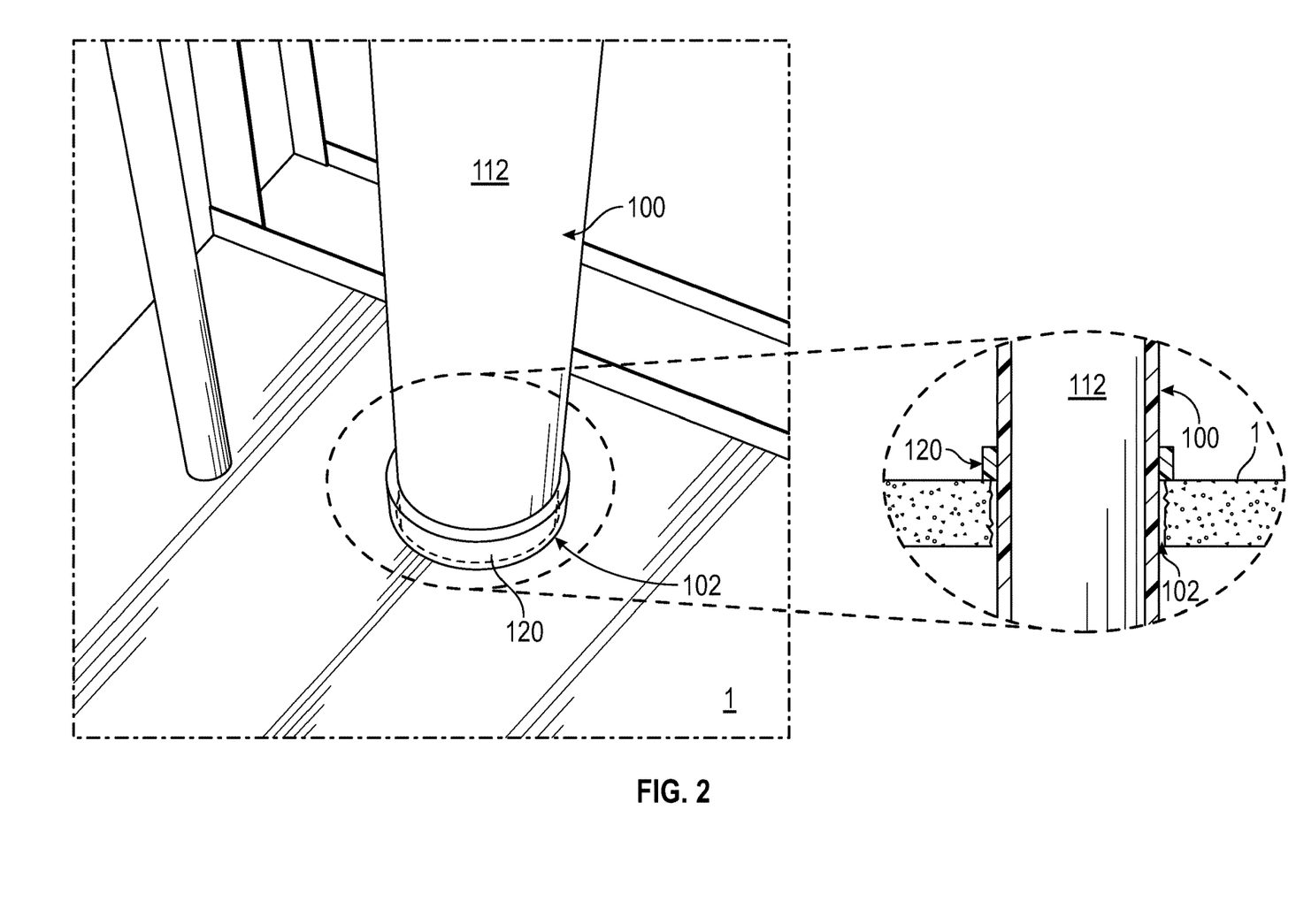
FIG. 2 is a magnified perspective view of an exemplary embodiment of a third plumbing system riser stack with an exemplary embodiment of a riser ring system engaged to a riser pipe segment of a riser stack 100.

FIG. 2 is a magnified perspective view of an exemplary embodiment of a third plumbing system riser stack 100 with an exemplary embodiment of a riser ring system 120 engaged to a riser pipe segment 112 of the riser stack 100. The riser stack 100 is 6 inches in diameter. The riser ring 120 is a single-component body configured as an annular ring. The riser stack 100 is a series of pipe segments, united by a friction fit or bonding-agent coupling 130 between adjacent pipe segments 112a,b (best seen in FIGS. 5-6). Typically, as is understood in the art, one to two coupled pipe segments are needed to extend across a construction or demolition-renovation site between floors.

The riser stack 100 vertically traverses a new-build or demolition-renovation setting via riser opening 102 in the floor 1. The riser opening 102 is not readily visible as it has been partially obscured by the riser ring 120. When the pipe segment 112 of the riser stack 100 is approximately extended through the opening 102 in the floor 1, and the annular riser ring 120 is slid onto the cylindrical body of the pipe segment 112, the annular riser ring 120 effectively increases the diameter of the pipe segment 112 to greater than 6 inches to prevent the pipe segment 112 from falling through the opening 102 (which has a slightly larger diameter than the 6 inches for the pipe segment 112). The annular riser ring 120 also establishes a tight but slidable friction-fit with the pipe segment 112, such that the pipe segment 112 can be adjustably extended from the floor below (not shown), and such that the annular riser ring 120 fits snuggly to prevent the pipe segment 112 from sliding out of the annular riser ring 120, when extended through the opening 102 but held in place by the annular riser ring 120.

The annular riser ring 120 is made out of PVC, like the pipe segment 112, but may be made of any other material known to one having ordinary skill the art. The annular riser ring 120 may come in various sizes and configurations to accommodate various different types and sizes of pipe segments 112 or other similar conduits, e.g., 3 to 4 inch pipe for drainage and 2 to 3 inch pipe for fluid intake, but numerous variations of pipe/conduit and different sizes/dimensions are understood in the art.

A person having ordinary skill in the art understands that, like riser clamps, the riser ring 120 does not hold the weight of the entire riser stack 100 nor does it provide structural integrity for the entire pipe or conduit system. The riser ring 120 is simply to holding the weight of one pipe segment 112, via the slidable friction fit as between the inside surface of the riser ring and the pipe or conduit, to prevent the one pipe segment 112 from falling through the opening 102 as the pipe segments are installed and the entire riser stack 100 is assembled. Therefore, the riser ring 120 does not need to have dimensions or structure to support heavy weights or forces, allowing for a very thin and minimal profile, dimension, and structure for all embodiments.

For example, the annular riser ring 120 is between about ½ inches to about ⅝ inches thick (thick=height off of the floor when installed) for this particular embodiment, but the thickness may vary depending on the particular circumstances. The width of annular riser ring also is between about ¼ inches to about ⅝ inches wide (wide=distance off of the pipe segment 112 when installed) for this particular embodiment, but the width may vary depending on the particular circumstances.

Figure 3:
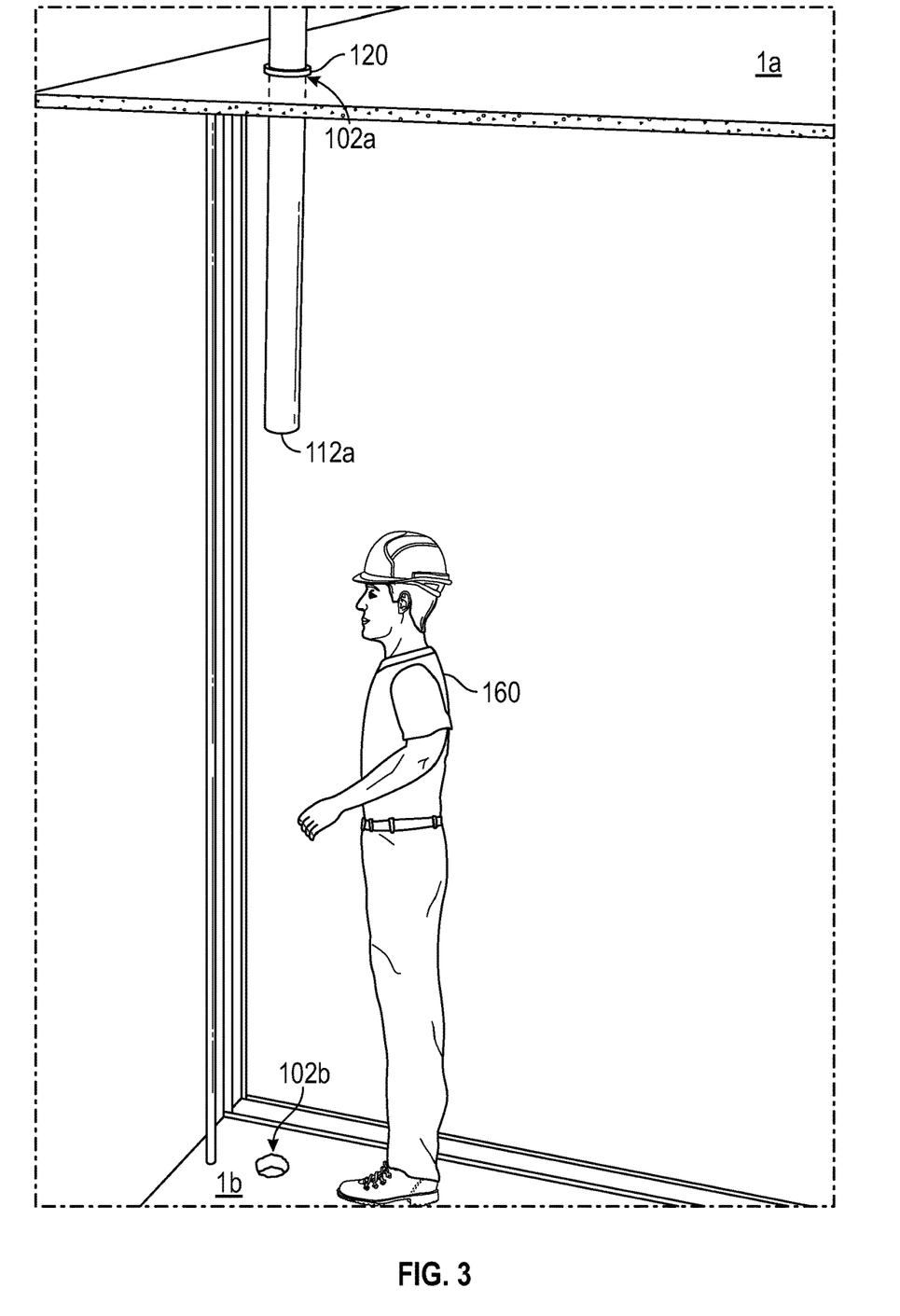

FIG. 3 is a perspective view of a non-limiting example of a floor 1a and a floor 1b within a new-build construction setting or a demolition-renovation setting. In particular, FIG. 3 is perspective view of a non-limiting example of a first riser pipe segment 112a for a plumbing system riser stack 100 (not shown), with a riser ring 120a of FIG. 2 engaged thereto, extending through the floor 1a and being prevented from falling through the opening 102a.

More specifically, the riser opening 102a is not readily visible as it has been partially obscured by the riser ring 120a. When the pipe segment 112a is approximately extended through the opening 102a in the floor 1a, and the annular riser ring 120a is slid onto the cylindrical periphery of the pipe segment 112a, the annular riser ring 120a effectively increases the diameter of the pipe segment 112a to a greater diameter than that of the riser opening 102a, to prevent the pipe segment 112a from falling through the opening 102a. In this way, the annular riser ring 120a establishes a tight but slidable friction-fit with the pipe segment 112a, such that the pipe segment 112a can be adjustably extended from the floor 1b by a non-limiting example of a human worker 160. The annular riser ring 120a also fits snuggly to prevent the pipe segment 112 from sliding out of the annular riser ring 120 when hanging from floor 1a.

Figure 4:
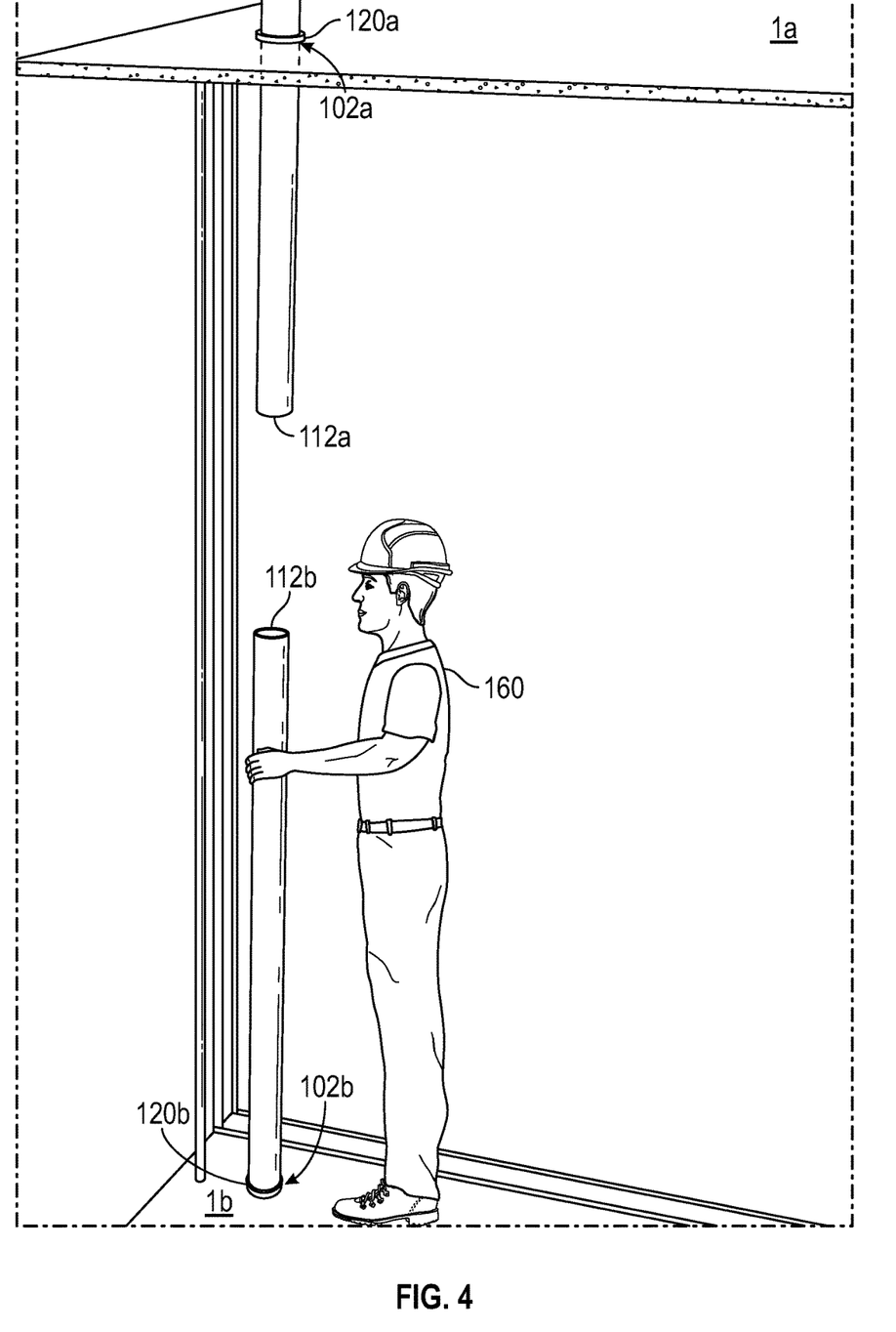
FIG. 4 is perspective view of a non-limiting example of a second riser pipe segment for the plumbing system riser extending through the lower floor of FIG. 3.

FIG. 4 is a perspective view of the floor 1a and the floor 1b of FIG. 3 within a new-build construction setting or a demolition-renovation setting. In particular, FIG. 4 is perspective view of a non-limiting example of a second riser pipe segment 112b for the plumbing system riser stack 100 (not shown) extending through the floor 1b. The first riser pipe segment 112a, with the riser ring 120 engaged thereto, remains extending through the floor 1a but has been adjusted by the human worker 160. The second riser pipe segment 112b has a riser ring 120b identical to riser ring 120a of FIG. 3 engaged thereto, extending through the floor 1b and being prevented from falling through the opening 102b.

More specifically, the riser opening 102b is not readily visible as it has been partially obscured by the riser ring 120b. When the pipe segment 112b is approximately extended through the opening 102b in the floor 1b, the annular riser ring 120b again prevents the pipe segment 112b from falling through the opening 102a. After the pipe segment 112a is adjusted, the human worker 160 may begin assembly of the riser stack 100 (not shown).

Figure 5:
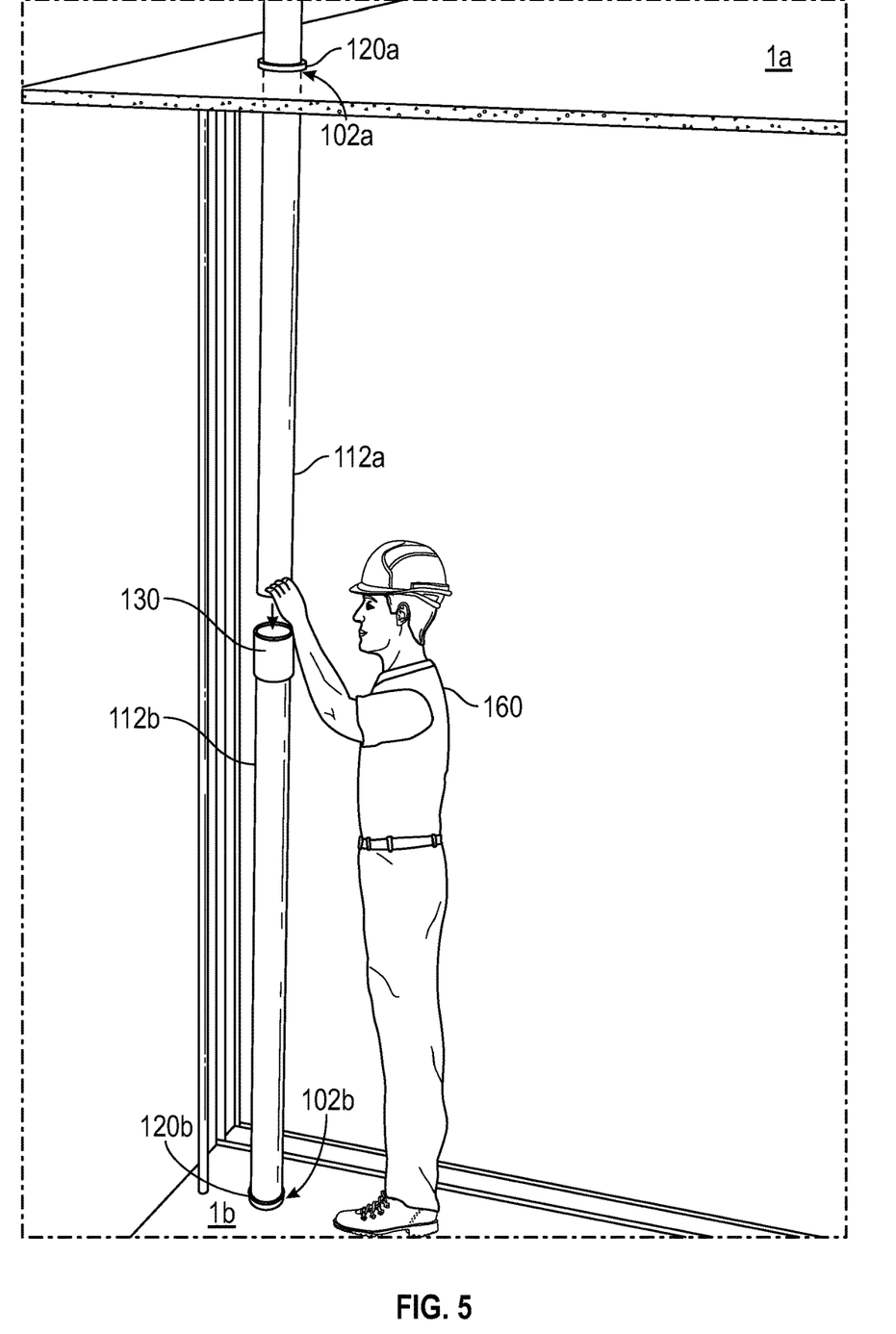
FIG. 5 is perspective view of the first riser pipe segment and the second riser pipe segment of FIGS. 3 and 4 being adjusted and united to form the plumbing system riser stack.

FIG. 5 is a perspective view of the floor 1a and the floor 1b of FIGS. 3 and 4; in particular, FIG. 5 is perspective view of the first riser pipe segment 112a and the second riser pipe segment 112b being adjusted and united to form the plumbing system riser stack 100. The riser stack 100 is a series of pipe segments, united by a friction fit or bonding-agent coupling 130 between adjacent pipe segments 112a,b.

Figure 6:
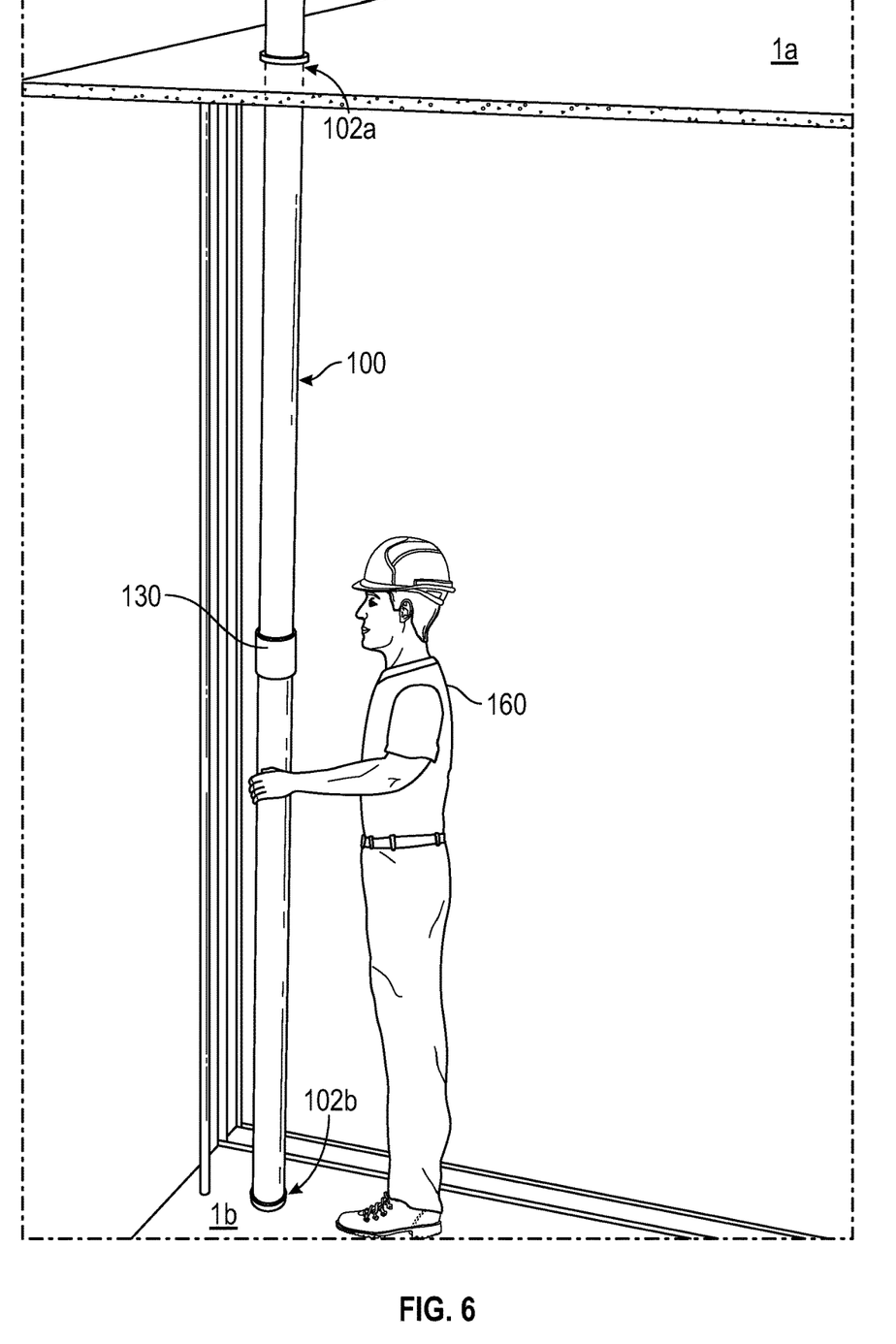
FIG. 6 is perspective view of the first riser pipe segment and the second riser pipe segment engaged via a coupling to form the plumbing system riser stack.

FIG. 6 is a perspective view of the floor 1a and the floor 1b of FIGS. 3-5; in particular, FIG. 6 is perspective view of the first riser pipe segment 112a and the second riser pipe segment 112b engaged via the coupling 130 to form the plumbing system riser stack 100. In this way, the plumbing system riser stack 100 vertically traverses the new-build or demolition-renovation setting via the riser openings 102a,b in the floors 1a,b, and there is no and was no need for prior art riser clamps of any kind.

Figure 7:
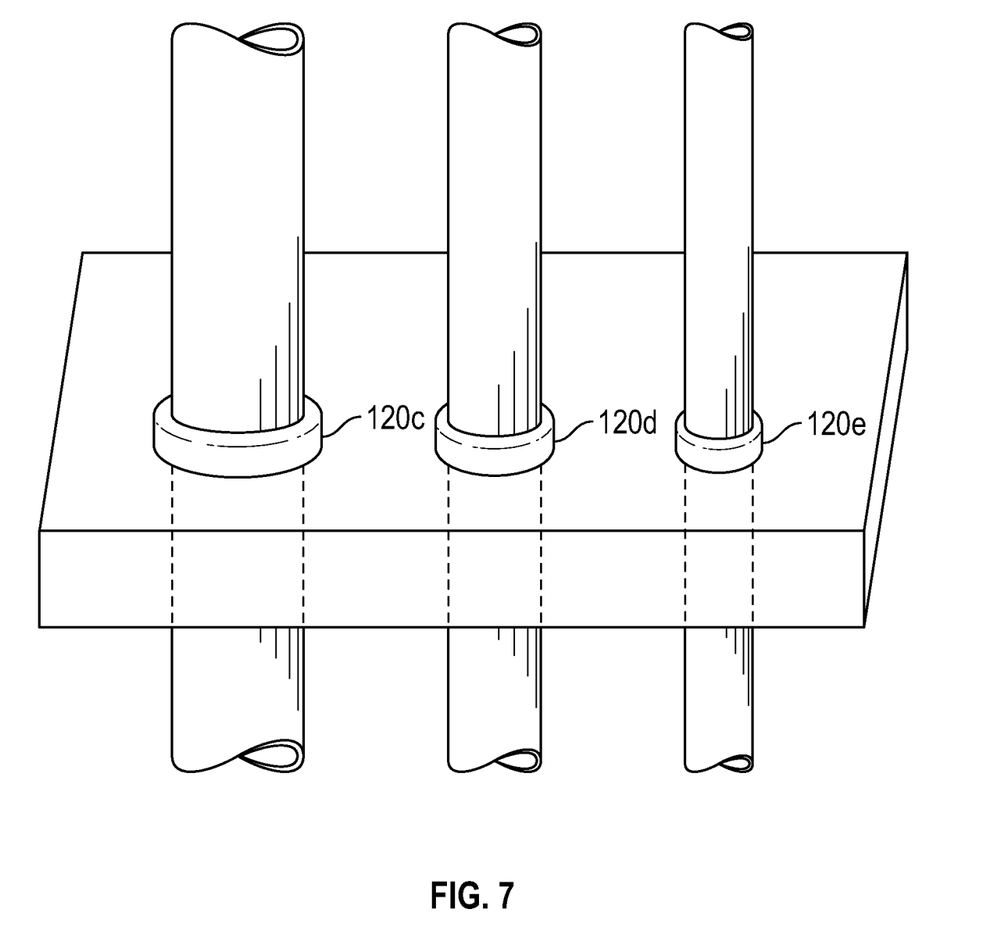
FIG. 7 is a perspective view of a first exemplary embodiment of a single-component riser ring for a 4 inch cylindrical pipe segment, a second exemplary embodiment of a single-component riser ring for a 3 inch cylindrical pipe segment, and a third exemplary embodiment of a single-component riser ring for a 2 inch cylindrical pipe segment.
Figure 8:
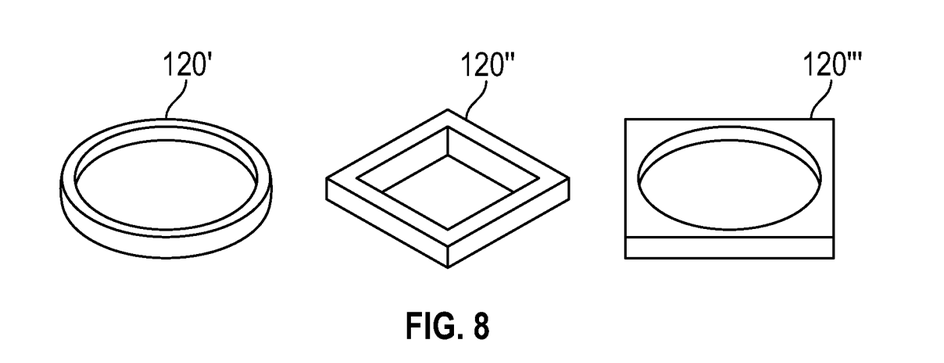
FIG. 8 is perspective view of a first exemplary embodiment of a single-component riser ring 120 in an exemplary embodiment of a circle configuration to match a non-limiting example of a cylindrical pipe segment, a second exemplary embodiment of a single-component riser ring for a 6 inch pipe segment in an exemplary embodiment of a square configuration to match a non-limiting example of a squared conduit, and a third exemplary embodiment of a single-component riser ring for a 6 inch pipe segment in an exemplary embodiment of a mixed circle-square configuration to match a non-limiting example of a cylindrical pipe segment but providing additional squared surface area.

FIGS. 7 and 8 are each, respectively, a perspective view of three (3) different exemplary embodiments of various sizes/dimensions or structural configurations for a single-component riser ring of the present invention. In particular, FIG. 7 illustrates a first exemplary embodiment of a single-component riser ring 120c for a 4 inch pipe cylindrical pipe segment. FIG. 7 also illustrates a second exemplary embodiment of a single-component riser ring 120d for a 3 inch cylindrical pipe segment. FIG. 7 also illustrates a third exemplary embodiment of a single-component riser ring 120e for a 2 inch cylindrical pipe segment.

FIG. 8 illustrates a first exemplary embodiment of a single-component riser ring 120' for a 6 inch pipe segment like that of FIGS. 3-6 in an exemplary embodiment of a circle configuration to match a non-limiting example of a cylindrical pipe segment. FIG. 8 also illustrates a second exemplary embodiment of a single-component riser ring 120" for a 6 inch pipe segment in an exemplary embodiment of a square configuration to match a non-limiting example of a squared conduit. FIG. 8 also illustrates a third exemplary embodiment of a single-component riser ring 120''' for a 6 inch pipe segment in an exemplary embodiment of a mixed circle-square configuration to match a non-limiting example of a cylindrical pipe segment but providing additional squared surface area for the riser ring 120'''.

A person having ordinary skill in the art understands that the riser ring may come in various sizes and configurations depending on (1) the size and configuration of the pipe or conduit, (2) the size and configuration of the opening in the floor, (3) the amount of overlap onto the floor, over the opening, that is desire, (4) the amount of height off of the floor that the riser ring is desired to be, e.g., to facilitate additional finishing of the floor surrounding the riser ring and the pipe or conduit if needed, and (5) optionally, the amount of weight and other forces the riser ring is intended to withstand while in friction-fit with the pipe or conduit. Although a single exemplary embodiment of a riser ring described herein is between about ½ inches to about ⅝ inches thick and between about ¼ inches to about ⅝ inches wide, this is not intended to limit this disclosure.

Figure 9:
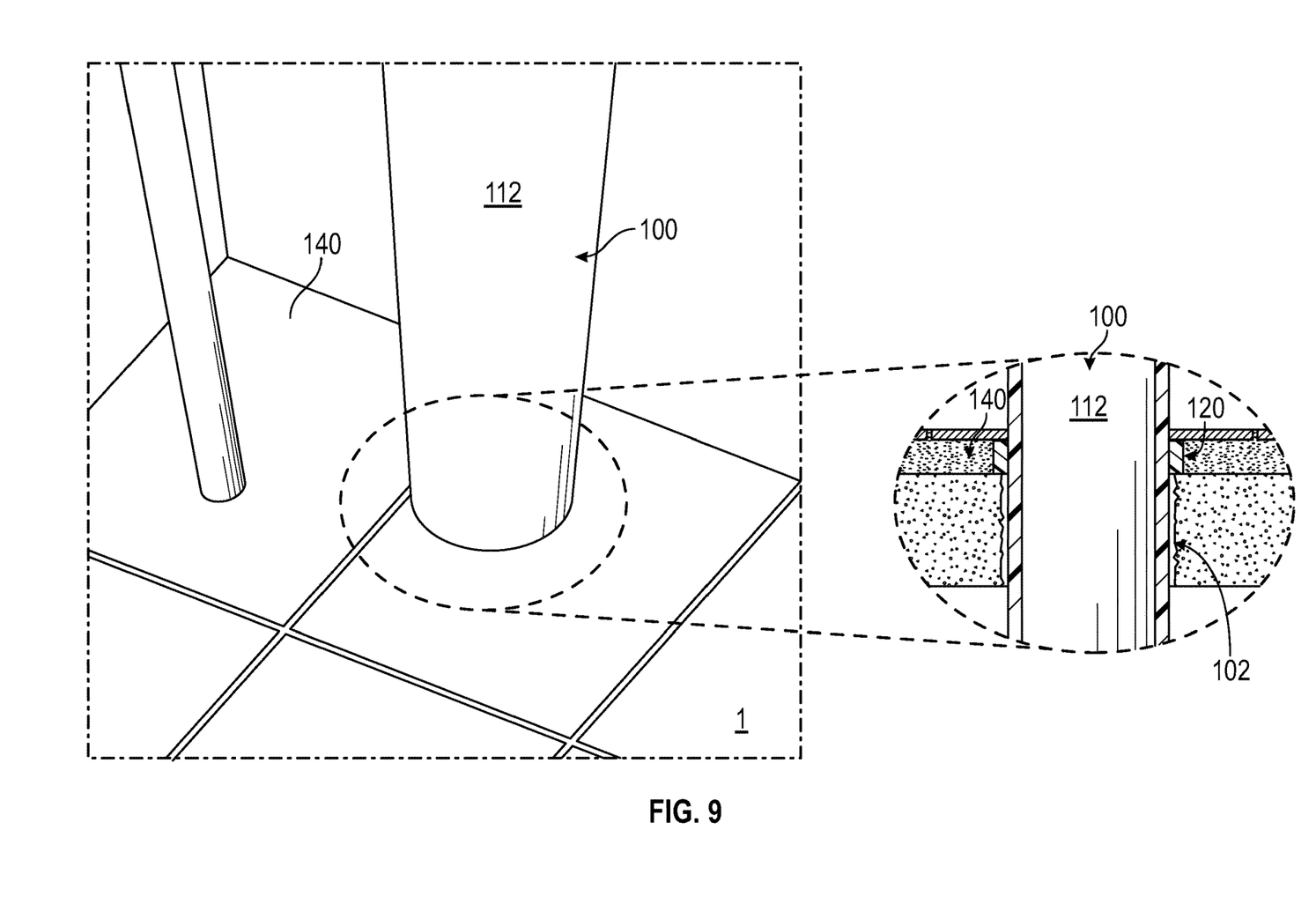
FIG. 9 is a magnified perspective view of the new-build construction setting or demolition-renovation setting of FIGS. 3-6 but with the floor finished and the riser ring left behind and embedded in the finished floor 1.

FIG. 9 is a magnified perspective view of the new-build construction setting or demolition-renovation setting of FIGS. 3-6 but with the floor 1 finished and the riser ring 120 left behind and embedded in the finished floor 1. In particular, FIG. 9 is a magnified perspective view of the exemplary embodiment of the third plumbing system riser stack 100 with the exemplary embodiment of the 6 inch annular riser ring 120 engaged to the riser pipe segment 112 of the riser stack 100. The riser stack 100 vertically traverses the new-build or demolition-renovation setting via the riser opening 102 in the finished floor 1. The riser opening 102 is not readily visible as it has been fully obscured by the floor finish 140 (e.g., gyperete base and tile layer in this exemplary embodiment).

A person having ordinary skill in the art understands that the riser ring 120 does not hold the weight of the pipe segment 112 in this exemplary embodiment but that it may be configured to provide such support in other configurations. Therefore, in this exemplary embodiment, the riser ring 120 has a very thin and minimal profile of between about ½ inches to about ⅝ inches thick and between about ¼ inches to about ⅝ inches wide. The floor finished 140 comprises a gyperete base and a tile layer. The gyperete base is industry standard at about ¾ inches to about 1 inch, which entirely covers the riser ring 120 and incorporates the riser ring 120 into the finished product. This ultimately hides the riser ring 120 and allows the riser ring 120 to be left in place for simplicity and cost-savings in labor, even when the floor 1 needs to be finished around the pipe segment 112.

A person having ordinary skill in the art also understands that the embedded riser ring 120 prevents the need to fill any remaining gap/opening 102 between the pipe segment 112 and the floor 1. The riser ring 120 also prevent any rattle or shaking that might usually occur as between the pipe segment 112 and the floor 1 when the riser rings 120 is not used and a riser clamp, for example, is removed.

In one or more exemplary embodiments described herein, the systems and methods described may be implemented in various ways using various methodologies. Although selected aspects have been illustrated and described in detail, it will be understood that various substitutions and alterations may be made therein without departing from the spirit and scope of the present invention, as defined by the following claims.

What is claimed is:

1. A method of servicing a riser stack, the method comprising:
a) providing an annular ring body as a riser ring, the annular ring body having an inside surface opposite an outside surface, a planar top surface opposite a planar bottom surface, and a cross section having a thickness defined from the planar top surface to the planar bottom surface and a width defined from the inside surface to the outside surface, the thickness constant about the annular ring;
b) extending a riser pipe segment through an opening in a floor, the riser pipe segment defining a length and having an external surface;

c) sliding the riser ring over the external surface of the riser pipe segment to a position along the length of the riser pipe segment, such that the riser ring and the riser pipe segment are engaged via a friction fit; and d) placing the riser ring with the engaged riser pipe segment onto the floor such that the riser pipe segment is prevented from falling through the opening by the riser ring.

2. The method of claim 1, additionally comprising adjusting, from below the floor, while the riser ring remains in contact with the floor, an extent the riser pipe segment extends through the opening.

3. The method of claim 1, additionally comprising adjusting, from above the floor, while the riser ring remains in contact with the floor, an extent the riser pipe segment extends through the opening.

4. The method of claim 1, additionally comprising finishing the floor around the opening such that the riser ring is embedded in the finished floor.

5. The method of claim 1, additionally comprising adjusting, while the riser ring remains in contact with the floor, an extent the riser pipe segment extends through the opening in the floor, by pulling or pushing the riser pipe segment, such that the riser ring slides over the external surface of the riser pipe segment to a second position along the length of the riser pipe segment.

* * * * *